United States Patent
Karmakar et al.

(10) Patent No.: US 9,800,736 B2
(45) Date of Patent: Oct. 24, 2017

(54) DEVICES, METHODS, AND SYSTEMS FOR MASS NOTIFICATION

(71) Applicant: Honeywell International Inc., Morristown, NJ (US)

(72) Inventors: Sheeladitya Karmakar, Bangalore (IN); Vinayak G, Bangalore (IN); Kallesh N. Patil, Bangalore (IN); Jerin Cherian, Bangalore (IN); Mukesh Vijay, Bangalore (IN); Bhawani Shekhawat, Bangalore (IN); Abhishek Kumar, Bangalore (IN); Manikandan M, Cuddalore (IN)

(73) Assignee: Honeywell Internatoinal Inc., Morris Plains, NJ (US)

( * ) Notice: Subject to any disclaimer, the term of this patent is extended or adjusted under 35 U.S.C. 154(b) by 354 days.

(21) Appl. No.: 13/838,117

(22) Filed: Mar. 15, 2013

(65) Prior Publication Data
US 2014/0270103 A1  Sep. 18, 2014

(51) Int. Cl.
*H04M 1/64* (2006.01)
*H04M 11/02* (2006.01)

(52) U.S. Cl.
CPC ................................ *H04M 11/022* (2013.01)

(58) Field of Classification Search
CPC ........... H04M 2207/185; H04M 3/533; H04M 3/537; H04W 12/02; H04W 4/12
USPC ............................................ 379/88.01–88.19
See application file for complete search history.

(56) References Cited

U.S. PATENT DOCUMENTS

| | | | |
|---|---|---|---|
| 6,442,249 B1* | 8/2002 | Miller, Jr. | H04M 1/663 379/199 |
| 7,277,018 B2 | 10/2007 | Reyes et al. | |
| 8,189,568 B2 | 5/2012 | Qiu et al. | |
| 2005/0221753 A1* | 10/2005 | Benco | H04M 3/53366 455/3.06 |
| 2007/0115930 A1 | 5/2007 | Reynolds et al. | |
| 2008/0096597 A1* | 4/2008 | Vempati | H04W 4/10 455/518 |
| 2009/0060160 A1 | 3/2009 | Kassas | |
| 2009/0077045 A1* | 3/2009 | Kirchmeier | G06Q 10/06 |
| 2009/0295587 A1 | 12/2009 | Gorman, Jr. | |
| 2009/0305659 A1* | 12/2009 | Hochendoner | H04L 12/1895 455/404.1 |
| 2010/0200336 A1* | 8/2010 | Hikita | B66B 5/021 187/247 |
| 2011/0151892 A1* | 6/2011 | Vengroff | H04W 4/02 455/456.3 |
| 2012/0050039 A1 | 3/2012 | Mutch et al. | |

(Continued)

FOREIGN PATENT DOCUMENTS

| | | |
|---|---|---|
| JP | 2009271734 | 11/2009 |
| WO | 2006026025 | 3/2006 |
| WO | 2009105578 | 8/2009 |

*Primary Examiner* — Solomon Bezuayehu
(74) *Attorney, Agent, or Firm* — Brooks, Cameron & Huebsch, PLLC

(57) ABSTRACT

Devices, methods, and systems for mass notification are described herein. One method includes receiving, by an operator station, a selection associated with a particular paging group of a fire network associated with a facility, receiving an audio message by the operator station, and communicating the audio message to the particular paging group according to the selection.

10 Claims, 3 Drawing Sheets

(56) References Cited

U.S. PATENT DOCUMENTS

| | | | |
|---|---|---|---|
| 2012/0185547 A1* | 7/2012 | Hugg | H04L 51/20 709/206 |
| 2012/0290396 A1* | 11/2012 | Petrov | G06Q 10/087 705/14.64 |
| 2013/0293355 A1* | 11/2013 | Christopher | G06K 7/10376 340/10.1 |
| 2014/0156768 A1* | 6/2014 | Arjunan | H04L 12/1822 709/206 |
| 2014/0228062 A1* | 8/2014 | Rubowitz | H04W 52/0277 455/466 |

* cited by examiner

DEVICES, METHODS, AND SYSTEMS FOR MASS NOTIFICATION

TECHNICAL FIELD

The present disclosure relates to devices, methods, and systems for mass notification.

BACKGROUND

Mass notification may be used to inform a large number and/or group people of a situation, make announcements, and/or provide direction, for example. Mass notification may be performed during emergencies, for instance, such as fires, fire drills, gas leaks, explosions, etc.

Previous mass notification approaches may use voice over Internet Protocol (VoIP) phones and/or speakers, and may include the installation and/or maintenance of separate VoIP phone lines, wiring, and/or devices across a facility. Previous mass notification approaches that use one or more digital voice controllers of a facility's fire network may be limited by reduced controller storage capacity, and may rely on an operator's proximity to such controller(s) to override pre-recorded messages (e.g., using a microphone associated with a digital voice controller). Further, such previous mass notification approaches may lack information about the quality of audio output during a mass notification and may thus render the effectiveness of the mass notification unknown to the operator.

DETAILED DESCRIPTION

Figure 1:
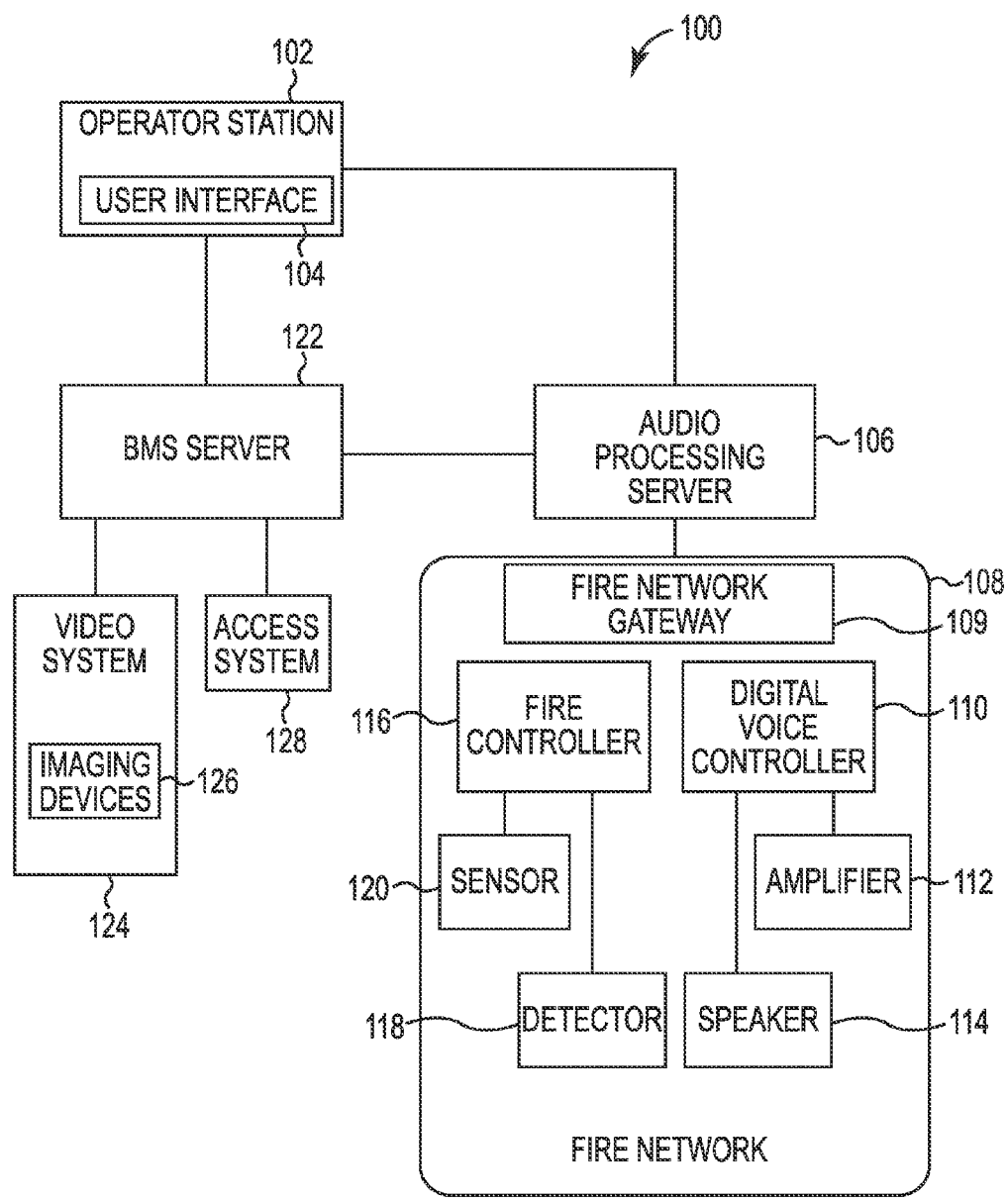
FIG. 1 illustrates a system for mass notification in accordance with one or more embodiments of the present disclosure.

Devices, methods, and systems for mass notification are described herein. For example, one or more embodiments include receiving, by an operator station, a selection associated with a particular paging group of a fire network associated with a facility, receiving an audio message by the operator station, and communicating the audio message to the particular paging group according to the selection.

Mass notification in accordance with one or more embodiments of the present disclosure can make use of existing fire controllers of a facility coupled with digital voice controllers, obviating the need to install costly phone lines, wiring, and/or devices across the facility (e.g., structure, plant, complex, campus, installation, business, etc.). Further, embodiments of the present disclosure can allow a user (e.g., operator) to perform mass notification from a computing device (sometimes referred to herein as "operator station") of a building management system (BMS) by sending live audio and/or pre-recorded messages from the operator station to the existing (e.g., already connected) controllers (e.g., fire controllers and/or digital voice controllers) of a fire network of a facility. As discussed further below, mass notification can include manual (e.g., user-controlled) and/or automatic (e.g., rule-based) operations.

By using an operator station in communication with a controller (e.g., via local area network (LAN) and/or wide area network (WAN)), rather than performing mass notification from a digital voice controller, embodiments of the present disclosure can perform mass notification irrespective of controller location. Further, embodiments can avoid inherent limitations on storage in controller(s) (e.g., for multiple pre-recorded messages), and can override pre-recorded messages irrespective of user proximity to controller location. The operator station can allow remote (e.g., inter-facility and/or interstate) mass notification by integrating with Distributed Server Architecture (DSA) of a Building Management System (BMS).

Further, the operator station can present an interactive user interface depicting various facilities and/or controllers of the facilities available for mass notification, for instance. The user interface can allow the formation of paging groups (e.g., logical groups of facilities and/or areas including one or more speakers, controllers, and/or amplifiers). The user interface can display floor plans and/or customized graphics (e.g., embedded shapelinks and/or buttons) for use in the creation and/or modification of paging groups.

Embodiments of the present disclosure can display output audio quality on the user interface. For example, embodiments can use various audio analytics algorithms (e.g., available audio analytics algorithms) at a digital voice controller to send feedback to the operator station associated with the quality of audio output being received at speakers connected to a controller. Such feedback can be displayed to the user on the user interface such that the user can be apprised of the effectiveness of the mass notification, for instance, and/or the quality of the audio output.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or mechanical changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced by 202 in FIG. 2.

As used herein, "a" or "a number of" something can refer to one or more such things. For example, "a number of controllers" can refer to one or more controllers.

FIG. 1 illustrates a system 100 for mass notification in accordance with one or more embodiments of the present disclosure. As shown in FIG. 1, system 100 can include an operator station 102, an audio processing server 106, a fire network 108, a BMS server 122, a video system 124, and an access system 128. However, systems for mass notification in accordance with embodiments of the present disclosure are not limited to the embodiment illustrated in FIG. 1 (e.g., various systems can include elements not illustrated in system 100 and/or exclude elements illustrated in system 100).

Operator station 102 can be a computing device (e.g., having a processor and a memory as discussed below in connection with FIG. 2). Although one operator station is shown in FIG. 1, embodiments of the present disclosure can include multiple operator stations. Various users can access operator station 102 and each user can be authenticated before being allowed access. As discussed further below in connection with FIG. 2, a user can have a priority level which may allow the user to control various functions of operator station 102 and/or system 100.

Operator station 102 can include a user interface (e.g., display) 104. User interface 104 can be and/or include various display technologies such as, for example, liquid crystal display (LCD), light emitting diode (LED) display, cathode ray tube (CRT) display, etc., and can display videos, data, and/or information to one or more users. Operator station 102 can include additional components such as one or more microphones, for instance, among others (not shown in FIG. 1).

Audio processing server 106 can include one or more devices (e.g., computing devices not shown in FIG. 1) configured to perform various functions discussed below (e.g., audio data encryption), for instance.

As shown in FIG. 1, fire network 108 can include a fire network gateway 109, a digital voice controller 110 coupled to a speaker 114 and an amplifier 112, and a fire controller 116 coupled to a detector 118 and a sensor 120. However, fire networks in accordance with embodiments of the present disclosure are not limited to the particular devices illustrated in FIG. 1. For example, fire network 108 can include multiple sensors, detectors, speakers and/or amplifiers, among other devices.

Fire network gateway 109 can be a component configured to control a rate at which audio is sent to controllers of fire network 108 (e.g., digital voice controller 110 and/or fire controller 116). For example, fire network gateway 109 can allow maintaining of audio quality and/or prevention of buffer underrun and/or overrun. Digital voice controller 110 can be a device configured to interface with and/or manage various audio devices (e.g., amplifier 112 and/or speaker 114). Amplifier 112 can be various types of amplifiers, and embodiments of the present disclosure are not limited to particular types of amplifiers. Similarly, speaker 114 can be various types of speakers, and embodiments of the present disclosure are not limited to particular types of speakers. For example, a facility can include a plurality of digital voice controllers, speakers, and/or amplifiers of various types, for instance, dispersed throughout the facility.

Fire controller 116 can be a device configured to interface with and/or manage various fire devices (e.g., detector 118 and/or sensor 120). Detector 118 can be various types of detectors (e.g., a smoke detector), and embodiments of the present disclosure are not limited to particular types of detectors. Similarly, sensor 120 can be various types of sensors (e.g., a temperature sensor), and embodiments of the present disclosure are not limited to particular types of sensors. For example, a facility can include a plurality of fire controllers, detectors, and/or sensors of various types, for instance, dispersed throughout the facility.

BMS server 122 can include one or more devices (e.g., computing devices, not shown in FIG. 1) configured to perform various functions discussed below, for instance. BMS server 122 can interact with and/or manage various systems and/or subsystems of a BMS system (e.g., energy systems, heating, ventilating, and air conditioning (HVAC) systems, etc.) (not illustrated in FIG. 1).

In some embodiments, BMS server 122 and/or operator station 102 can be located separately (e.g., remotely, such as in a different geographical location and/or facility) with respect to audio processing server 106, fire network 108, video system 124, and/or access system 128. Whereas audio processing server 106, fire network 108, video system 124, and/or access system 128 can be associated with a particular facility, locations associated with BMS server 122 and/or operator station 102 are not so limited. For example, operator station 102 can be located at a first geographical location (e.g., a BMS command center), and fire network 108, video system 124, and/or access system 128 can be located at a second geographical location (e.g., the facility).

Video system 124 can manage a video system associated with a facility. Video system 124 can include a plurality of imaging devices 126 and/or one or more computing devices (not illustrated in FIG. 1). Imaging devices 126 can be various types of imaging devices (e.g., video cameras), and embodiments of the present disclosure are not limited to particular types of imaging devices. For example, imaging devices 126 can be dispersed throughout a facility. Each of imaging devices 126 can capture a respective video of a portion of a facility and communicate the captured video to operator station 102, for instance.

Access system 128 can manage access, security, and/or occupancy associated with a facility. Access system 128 can include various sensors, identification card scanners, lighting systems, alarm systems, etc (not shown in FIG. 1). Although shown in FIG. 1 as being separate from video system 124 in some embodiments, access system 128 can be integrated and/or correlated with video system 124.

A user can be authenticated and/or gain access to operator station 102 such that the user can visualize user interface 104. User interface 104 can display various interfaces that can be customized by the user, for instance. For example, user interface 104 can display a graphical representation of the facility, fire network 108 and/or a portion of fire network 108. Such a graphical representation can include a floor plan (e.g., two or three-dimensional rendering) of a facility housing fire network 108, for instance, along with locations (e.g., denoted by icons) of various components of fire network 108 (e.g., digital voice controller 110, amplifier 112, and/or speaker 114). Such a graphical representation can include a hierarchical tree view form of the facility model (e.g., derived from existing facility model of the BMS). Such components may be selectable in various manners (e.g., a mouse click).

A user can select a portion of fire network 108 to be used for a mass notification. The selected portion of fire network 108 may be referred to as a paging group. A paging group can include various numbers of controllers, amplifiers, and/or speakers, for instance. For example, a paging group can include a single component fire network 108, all components of fire network 108, or a portion of the components of fire network 108. A paging group can be saved in memory. A selection of a paging group can be made in advance of a mass notification (e.g., the paging group can be pre-selected) and/or during a mass notification.

A user can set a rule causing the activation of a paging group responsive to a particular event (e.g., an event associated with fire network 108 and/or a portion of fire network 108). For example, a paging group may consist of speakers contained in a room of a facility. A rule can be set causing the activation of the paging group (e.g., the speakers in the room) responsive to a detector (e.g., detector 118) in the same room being activated. Paging groups can overlap and can each be activated by various rules. Additionally, paging groups can be activated and mass notification initiated upon various user commands and/or inputs. For example, a user can select a paging group and perform mass notification irrespective of various existing rules (e.g., the user can override a pre-recorded message by speaking into a microphone associated with operator station 102).

Mass notification can include the playing of messages recorded in advance of the mass notification (sometimes generally referred to herein as pre-recorded messages or messages received before a selection of a paging group), various sounds and/or tones, and/or audio messages received during the mass notification (e.g., real-time audio) from operator station 102 (e.g., using a microphone associated with operator station 102) after the selection of the paging group. Operator station 102 can receive an audio message from a user and/or from another device (e.g., from another computing device and/or storage device) in advance of a mass notification and/or during a mass notification. Particular audio messages can be created and/or played in accordance with rules. For example, an audio message associated with a fire in a particular room of a facility can be played responsive to sensor 120 sensing a fire in that room.

As previously discussed, operator station 102 can receive a selection associated with a particular paging group (e.g., speaker 114) and/or an audio message. A component (e.g., an ActiveX component) of operator station 102 can capture audio data (e.g., audio packets) associated with the audio message. Audio data can be captured from an audio driver buffer of operator station 102 in instances using real-time messages (e.g., being spoken by the user during the mass notification). Audio data can be captured from pre-recorded audio messages. The audio data and the selection of the paging group can be communicated to audio processing server 106 (e.g., via User Datagram Protocol (UDP)).

Having received the audio data and the selection of the paging group, audio processing server 106 can send a command to fire network 108 to activate the selected paging group (e.g., speaker 114). Audio processing server 106 can encrypt the audio data and communicate the encrypted audio data to the selected paging group of fire network 108 (e.g., via UDP).

Fire network 108 (e.g., digital voice controller 110) can receive the encrypted audio data, decode the encrypted audio data, decompress the audio data, and/or convert the audio data (e.g., digital audio data) to analog audio data. Digital voice controller 110 can send the analog audio data to amplifier 112 and subsequently to speaker 114. Speaker 114 can then play the analog audio data as an audio message (mass notification).

During and/or subsequent to the playing of the audio message, digital voice controller 110 can determine a quality of the audio message. A quality of the audio message can be a particular value within a range of quality values, for instance. Additionally, digital voice controller 110 can determine whether any system errors (e.g., loss of connectivity) have occurred. Digital voice controller 110 can communicate the quality of the audio message and any system errors to audio processing server 106 as feedback. Audio processing server 106 can communicate the feedback to BMS server 122 (e.g., via Transmission Control Protocol (TCP)) where it can be accessed by operator station 102 (e.g., via Hypertext Transfer Protocol (HTTP)) and/or displayed using user interface 104.

For example, digital voice controller 110 can determine that a quality of the audio message was 8 on a scale of 1 to 10, and communicate that determination to operator station 102 and/or a user of operator station 102 via user interface 104. Various rules associated with determined qualities may be created. For example, if operator station 102 determines that the audio quality of an audio message exceeds a particular threshold (e.g., is unintelligible and/or otherwise of insufficient quality), operator station 102 can activate and/or initiate additional or alternative mass notification techniques (e.g., manual evacuation, notification of authorities, activation fire alarm and/or siren, etc.). Initiating a manual evacuation (e.g., using personnel) can include notifying a user of operator station 102 via user interface 104 that a manual evacuation is recommended, for instance.

As previously discussed, system 100 includes video system 124 and access system 128. Video system 124 can include imaging devices 126 configured to capture video of a facility (e.g., video of entry and/or exit points of the facility). The captured video can be communicated to operator station 102 via BMS server 122 and/or displayed on user interface 104. As previously discussed, access system 128 can include various sensors, identification card scanners, lighting systems, alarm systems, etc. configured to gather information about the control of entry and/or exit points of the facility, among other access information. Such information can be communicated to operator station 102 via BMS server 122 and/or displayed on user interface 104.

Video system 124 and/or access system 126 can provide information about the status of the facility (e.g., portion(s) of the facility) and/or location(s) people in the facility during a mass notification. Such information can be referred to as evacuation information, for instance, though such reference is not to be taken in a limiting sense and does not include only information related to facility evacuation.

Evacuation information can be displayed on user interface 104 in the form of videos, animations, charts, text, graphics, etc. Evacuation information can allow a user of operator station 102 to visualize the movement of people through and/or out of a facility during a mass notification. Visualizing evacuation information can offer a user enhanced judgment and/or decision-making capability. For example, a user can receive video captured by imaging devices 126 showing a blockage of a particular exit of a facility (e.g., due to fire). The user can tailor a mass notification accordingly. For example, the user can announce, via an audio message played by speaker 114, that people should vacate the facility using a different exit.

Information received from access system 128 can, for instance, be used to ensure a complete evacuation. For example, as people enter a facility, access system 128 can scan an identification badge associated with each person. During a mass notification, similar scanning can be performed by access system 128 as the people vacate the facility. User interface 104 can inform a user as to people remaining in the facility and/or their locations within the facility. User interface 104 can provide a notification associated with a blockage of a particular exit of the facility (e.g., a blockage determined by and/or received from access system 128). Accordingly, a user of operator station 102 can be kept apprised of the progression of an evacuation during a mass notification and can adjust various aspects of the mass notification based on the progression.

Figure 2:
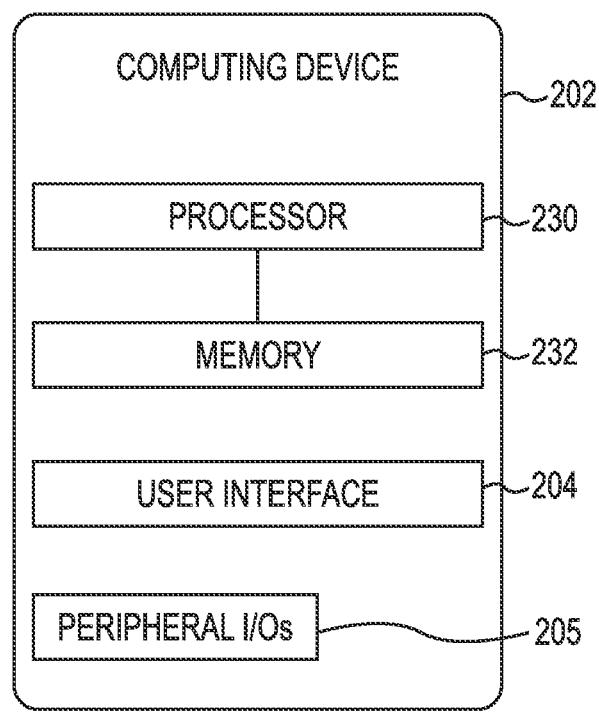
FIG. 2 illustrates a computing device for mass notification in accordance with one or more embodiments of the present disclosure.

FIG. 2 illustrates a computing device 202 for mass notification in accordance with one or more embodiments of the present disclosure. Computing device 202 can be, for example, a laptop computer, a desktop computer, or a mobile device (e.g., a mobile phone, a personal digital assistant, etc.), among other types of computing devices. Computing device 202 can be analogous to operator station 102 previously discussed in connection with FIG. 1.

As shown in FIG. 2, computing device 202 includes a memory 232 and a processor 230 coupled to memory 232. Memory 232 can be any type of storage medium that can be accessed by processor 230 to perform various examples of the present disclosure. For example, memory 232 can be a non-transitory computer readable medium having computer readable instructions (e.g., computer program instructions) stored thereon that are executable by processor 230 to perform and/or manage mass notification in accordance with one or more embodiments of the present disclosure. As shown in FIG. 2, computing device 202 includes peripheral I/Os 205. Peripheral I/Os 205 can include input/output ports for various peripheral devices such as a keyboard, a mouse, a printer, a scanner, etc. (not illustrated in FIG. 2).

For example, memory 232 can store instructions executable by processor 230 to authenticate one or more users to a building management system (e.g., to computing device 202). Authentication can include the authentication of a username and/or password entered by a user. Authentication can include various biometric authentication techniques including, for example, fingerprint authentication, voice recognition, retinal scanning, etc. For example, a user can speak a voice entry (e.g., a particular word and/or phrase) into a microphone of computing device 202 (not illustrated in FIG. 2). Computing device 202 can receive the voice entry and compare the received voice entry with a stored voice entry to authenticate the user to the BMS (e.g., system 100, previously discussed in connection with FIG. 1).

Memory 232 can store instructions executable by processor 230 to authenticate a first user having a first priority level to a building management system. A priority level, as used herein, can refer to a level of access and/or control granted to a particular user. A priority level can be assigned to the user by an institution managing and/or maintaining the BMS. Institutions can include organizations, companies, governing bodies, individuals, etc. An institution can employ a user, for instance. A user's rank and/or position within the institution can be associated with the user's priority level. For example, a low-level employee of a company may have a lesser priority level than an experienced employee.

Memory 232 can store instructions executable by processor 230 to allow the first user to select a particular paging group of a fire network of the BMS (e.g., fire network 108 previously described in connection with FIG. 1), and indicate a particular audio message associated with an event to be played during the event by the particular paging group in a manner analogous to that previously discussed in connection with FIG. 1, for instance.

Memory 232 can store instructions executable by processor 230 to authenticate a second user (e.g., to a different computing device and/or operator station) having a second priority level. A second user can be authenticated after the first user has been authenticated (e.g., while the first user is operating computing device 102). Memory 232 can store instructions executable by processor 230 to allow the second user to override the selection and the indication during the event subsequent to a determination that the second priority level exceeds a particular threshold.

Instructions allowing the overriding of the selection and the indication can include instructions to receive a second selection and a second indication from the second user instead of the selection and the indication from the first user. Exceeding a threshold can include the second priority level being higher than the first priority level. Exceeding a threshold can include the second priority level being a particular amount and/or degree higher than the first priority level. Memory 232 can store instructions executable by processor 230 to notify the first user that the second user has been authenticated and/or has overridden selections and/or indications made by the first user. Memory 232 can store instructions executable by processor 230 to provide a notification associated with the authentication of the second user to the first user responsive to the authentication of the second user.

In instances where computing device 202 determines that the first and second priority levels are substantially equal, memory 232 can store instructions executable by processor 230 to provide a notification to a third user (e.g., a facility manager). The third user can be a user having a higher priority level than the first user and the second user. Memory 232 can store instructions executable by processor 230 to allow the third user to override any selections and/or indications made by the first user and/or the second user. Memory 232 can store instructions executable by processor 230 to notify the first and/or second user that the third user has been authenticated and/or has overridden selections and/or indications made by the first and/or second user.

Memory 232 can be volatile or nonvolatile memory. Memory 232 can also be removable (e.g., portable) memory, or non-removable (e.g., internal) memory. For example, memory 232 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 232 is illustrated as being located in computing device 202, embodiments of the present disclosure are not so limited. For example, memory 232 can also be located internal to another computing resource (e.g., enabling computer readable instructions to be downloaded over the Internet or another wired or wireless connection).

Figure 3:
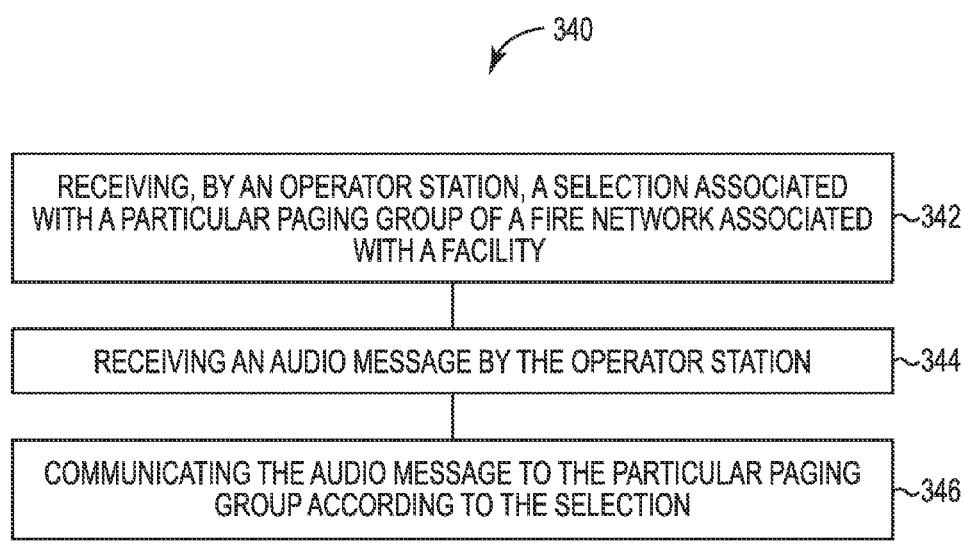
FIG. 3 illustrates a method for mass notification in accordance with one or more embodiments of the present disclosure.

FIG. 3 illustrates a method 340 for mass notification in accordance with one or more embodiments of the present disclosure. Method 340 can be performed, for example, by a computing device, such as computing device 202 previously discussed (e.g., in connection with FIG. 2).

At block 342, method 340 includes receiving, by an operator station (e.g., of a building management system), a selection associated with a particular paging group of a fire network associated with a facility. Paging groups can include one or more of various components such as those discussed previously in connection with FIG. 1, for instance.

At block 344, method 340 includes receiving an audio message by the operator station. Audio messages can be received from devices and/or users (e.g., speaking into a microphone). Audio messages can be received in advance of a mass notification (e.g., pre-recorded) and/or created during a mass notification, in a manner analogous to that previously discussed in connection with FIG. 1.

At block 346, method 340 includes communicating the audio message to the particular paging group according to the selection. Audio messages can be communicated to the particular paging group by way of an audio processing server (e.g., audio processing server 106), for instance.

Audio messages can be encrypted in a manner analogous to that previously discussed in connection with FIG. 1.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for mass notification, comprising:
   receiving, by an operator station, a selection associated with a particular paging group of a fire network associated with a facility, the fire network including a plurality of speakers and a smoke detector, wherein the particular paging group includes a particular subset of the plurality of speakers;
   displaying a graphical representation of the selected paging group by the operator station;
   receiving an audio message by the operator station;
   activating the particular paging group by a processor responsive to the smoke detector being activated;
   communicating the audio message by the processor to the particular paging group according to the selection;
   playing the audio message by the particular subset of the plurality of speakers as a mass notification;
   determining, by the operator station, whether a quality of the played audio message meets or exceeds a particular threshold;
   initiating, by the operator station, an alternative mass notification technique in response to a determination that the quality of the played audio message meets or exceeds the particular threshold;
   displaying movement of people through the facility by the operator station during the mass notification;
   determining a blockage of a particular exit of the facility during the mass notification by an access control system associated with the facility; and
   displaying a notification associated with the determined blockage by the operator station.

2. The method of claim 1, wherein the particular paging group includes at least one digital voice controller.

3. The method of claim 1, wherein the method includes receiving the audio message by a microphone associated with the operator station.

4. The method of claim 1, wherein the method includes receiving the audio message before receiving the selection.

5. The method of claim 1, wherein the method includes receiving the audio message after receiving the selection.

6. The method of claim 1, wherein the method includes overriding a pre-recorded message responsive to a user input made at the operator station.

7. The method of claim 1, wherein the selection is made using a graphical representation of the facility.

8. The method of claim 1, wherein the method includes communicating the audio message to the particular paging group according to the selection responsive to a particular event associated with the fire network.

9. The method of claim 1, wherein the alternative mass notification technique includes a notification of authorities.

10. The method of claim 1, wherein the alternative mass notification technique includes a fire alarm activation.

* * * * *